(12) United States Patent
Chane-Ching

(10) Patent No.: US 8,026,287 B2
(45) Date of Patent: Sep. 27, 2011

(54) COLLOIDAL DISPERSION OF CALCIUM PHOSPHATE PLATELETS, AND ITS PROCESS OF PREPARATION

(75) Inventor: Jean-Yves Chane-Ching, Eaubonne (FR)

(73) Assignee: Innophos, Inc., Cranbury, NJ (US)

( * ) Notice: Subject to any disclaimer, the term of this patent is extended or adjusted under 35 U.S.C. 154(b) by 0 days.

(21) Appl. No.: 12/897,333

(22) Filed: Oct. 4, 2010

(65) Prior Publication Data
US 2011/0021685 A1    Jan. 27, 2011

Related U.S. Application Data

(63) Continuation of application No. 10/563,167, filed as application No. PCT/FR2004/001647 on Jun. 28, 2004, now Pat. No. 7,807,724.

(30) Foreign Application Priority Data

Jun. 30, 2003   (FR) ...................................... 03 07879

(51) Int. Cl.
*C09K 3/00*   (2006.01)
(52) U.S. Cl. ................................ 516/88; 516/77; 516/78
(58) Field of Classification Search ............... 516/77, 516/78, 88
See application file for complete search history.

(56) References Cited

U.S. PATENT DOCUMENTS

| 4,603,006 | A |   | 7/1986 | Sikes et al. |
| 4,721,615 | A |   | 1/1988 | Griffith et al. |
| 5,051,401 | A |   | 9/1991 | Sikes |
| 5,427,754 | A |   | 6/1995 | Nagata et al. |
| 5,782,971 | A |   | 7/1998 | Constantz et al. |
| 6,159,437 | A | * | 12/2000 | Itoi et al. .................. 423/308 |
| 7,247,288 | B2 | * | 7/2007 | Kumta et al. .............. 423/308 |

FOREIGN PATENT DOCUMENTS

| EP | 2000128513 | 9/2000 |
| JP | 2000128513 | 5/2000 |

OTHER PUBLICATIONS

International Search Report for WO2005/002720 A3.
Fujishiro et al., "Coating of Hydroxyapatite on Titanium Plates Using Thermal Dissociation of Calcium-EDTA Chelate Complex in Phosphate Solutions Under Hydrothermal Conditions," Journal of Colloid and Interface Science 173, 119-127 (1995).

* cited by examiner

*Primary Examiner* — Ling Choi
*Assistant Examiner* — Chun-Cheng Wang
(74) *Attorney, Agent, or Firm* — McCarter & English LLP

(57) ABSTRACT

The invention provides colloidal dispersions of calcium phosphate platelets comprising at least one polymer which complexes the calcium and in which the length of the platelets, L, is between 5 and 500 nm and in which the thickness of the platelets is between 0.5 and 20 nm.
Another subject-matter of the invention is the calcium phosphate platelets obtained by drying the colloidal dispersion according to the invention.
The invention also provides a process for preparing these colloidal dispersions of calcium phosphate platelets according to the invention.
Finally, another subject-matter of the invention is the use of the abovementioned colloidal dispersions of platelets as food additive, reinforcing filler, thermal insulation filler, pharmaceutical excipient, polishing agent, building materials, additive for oral formulations, in particular dentifrices, or encapsulating agent.

13 Claims, No Drawings

COLLOIDAL DISPERSION OF CALCIUM PHOSPHATE PLATELETS, AND ITS PROCESS OF PREPARATION

This application is a continuation application under 35 U.S.C. §120 and claims priority to U.S. patent application Ser. No. 10/563,167 filed on May 25, 2006 now U.S. Pat. No. 7,807,724, which claims priority to International Application No. PCT/FR04/01647 filed on Jun. 28, 2004 and French Application No. 0307879 filed on Jun. 30, 2003, the entire contents of each of which is hereby incorporated by reference.

A subject-matter of the present invention is colloidal dispersions of calcium phosphate platelets, and their process of preparation.

In many products, it is of use to add compounds, in particular calcium phosphate, of use as reinforcing filler, thermal insulation filler, pharmaceutical excipient, polishing agent, support agent, building materials, additive for oral formulations or encapsulating agent.

In particular, it is known to use calcium phosphate in different forms, such as, for example, the platelet, particle or dispersion forms.

However, in the case of dispersions, the calcium phosphate dispersions currently available exhibit a low transparency, which is a disadvantage when it is desired to use these dispersions as reinforcing filler, for example in transparent polymer matrices. This low transparency is due to the size of the objects present in the dispersion, in particular to the size of the calcium phosphate particles obtained by current techniques.

In point of fact, the technologies currently available do not make it possible to obtain colloidal dispersions of calcium phosphate platelets having a platelet size of less than one micron.

In the case of the platelet form, it is possible to reinforce a matrix by calcium phosphate platelets which makes it possible to increase the tortuousness of the diffusional pathway of gases and to reduce the diffusion of gases through these reinforced materials.

However, the calcium phosphate platelets currently available do not reduce or do not reduce by very much the diffusion of gases.

In order to meet the requirements of manufacturers, it has become necessary to find other means for providing stable compounds possessing a morphology which is controlled and small in size, in particular less than one micron.

Consequently, the problem which the invention proposes to solve is that of providing a compound, in particular in the form of a dispersion, which is stable, which is nanometric in size and which has a controlled and platelet morphology.

With this aim, the invention provides colloidal dispersions of calcium phosphate platelets comprising at least one polymer which complexes calcium and in which the length of the platelets, L, is between 5 and 500 nm and in which the thickness of the platelets is between 0.5 and 20 nm.

Another subject-matter of the invention is the calcium phosphate platelets obtained by drying the colloidal dispersion according to the invention.

The invention also provides a process for preparing these colloidal dispersions of calcium phosphate platelets according to the invention.

Finally, another subject-matter of the invention is the use of the abovementioned colloidal dispersions of platelets as food additive, reinforcing filler, thermal insulation filler, pharmaceutical excipient, polishing agent, building materials, additive for oral formulations, in particular dentifrices, or encapsulating agent.

The dispersions according to the invention have the advantage of being able to enrich in calcium the product in which they are incorporated. This is the case in particular in the food field, where it is possible to incorporate the dispersions according to the invention in foods, drinks or food preparations, so as to supplement these products with calcium. This is also the case in the pharmacological field, where it is of use to add the dispersions according to the invention as calcium source to tablets or solutions for the purpose, for example, of preventing osteoporosis or treating bone diseases.

The dispersions according to the invention have the additional advantage of being clear to the eye, which makes it possible to be able to incorporate them in liquids without modifying the initial transparency of the liquid in which they are incorporated.

The invention has the advantage of providing a calcium source which can be a precursor of hydroxyapatite [$Ca_{10}(PO_4)_6(OH)_2$], which is the mineral substance which is deposited on the bone matrix during construction of the skeleton.

Another advantage of the invention is that of providing colloidal dispersions of calcium phosphate platelets which can be used in the dental field in order to prevent demineralization, in particular in toothpastes or mouthwashes.

A further advantage of the invention is that of not using caseins.

Another advantage of the invention is that of providing colloidal dispersions of platelets which can provide the products to which they are added with high concentrations of calcium.

Other advantages and characteristics of the present invention will become more clearly apparent on reading the description and examples which will follow, given purely by way of illustration and without implied limitation.

The invention relates first of all to a colloidal dispersion of calcium phosphate platelets comprising at least one polymer which complexes calcium and in which the length of the platelets, L, is between 5 and 500 nm and in which the thickness of the platelets is between 0.5 and 20 nm.

The dispersions according to the invention preferably comprise calcium phosphate platelets advantageously exhibiting a monetite or apatite structure. The monetite structure or the apatite structure can be demonstrated by X-ray diffraction, but also by other conventional techniques in this field.

The morphology of the platelets present in the dispersion according to the invention can be displayed, inter alia, by transmission electron microscopy.

The term "platelets", within the meaning of the invention, is understood as referring to bar or sheet or strip shapes and more generally any volume which has a low thickness and a greater length than width.

The dispersions according to the invention exhibit platelets having a length, L, advantageously of between 5 and 300 nm, preferably between 5 and 200 nm, and having a thickness preferably of between 0.5 and 15 nm. These sizes were determined by transmission electron microscopy using cryomicroscopy according to the Dubochet technique. This microscopy technique can be applied to dilute dispersions. This technique makes it possible to display the state of aggregation of the platelets.

The platelets present in the dispersion according to the invention can be composed of separately individual platelets. The dispersions according to the invention can also comprise aggregates of several individual platelets. Advantageously, 60% by number of the platelets or of the platelet aggregates in the dispersion have a size of less than or equal to 500 nm, preferably 70% and advantageously 80%.

The size of the platelets can also be determined by quasielastic light scattering. By this technique, an equivalent diameter, $d_{50}$, is determined which is between 50 and 300 nm.

The colloidal dispersions according to the invention can comprise at least one polymer which complexes calcium having anionic functional groups, preferably carboxylate, phosphate or phosphonate functional groups.

The polymer can be found in the continuous phase of the dispersion or in the noncontinuous phase, that is to say at the level of the platelets, for example adsorbed at the surface of the platelets or bonded to the latter.

Advantageously, the polymer which complexes calcium is chosen from polymers with a peptide backbone of polyaspartic acid, polyglutamic acid, polylysine or polyglycine type, or else from homopolymers and copolymers of acrylic acid or methacrylic acid, polyacrylic acid or polymethacrylic acid, or else from copolymers of the polyacrylic-polymethacrylic, polyacrylic-polyhydroxyethylacrylic or polyacrylic-polyacrylamide type, or else from natural and/or modified polysaccharide polymers, such as guar gum, carboxymethylcellulose or xanthan gum, or else from modified polysaccharide polymers having phosphate or phosphonate functional groups, or else from peptide polymers comprising phosphate functional groups.

Advantageously, the polymer which complexes calcium employed in the dispersions according to the invention has a molecular weight, MW, of between 1000 and 20 000 g/mol, preferably of between 1000 and 5000 g/mol.

It is possible to determine, for each dispersion, the molar ratio $R_1$:

$$R_1 = \frac{\text{moles of anionic functional groups present in the polymer}}{\text{moles of calcium}}$$

Preferably, this molar ratio, $R_1$, is between 0.0001 and 0.1, advantageously between 0.0001 and 0.03.

The platelets present in the dispersion according to the invention advantageously exhibit an apatite structure when the polymer used is preferably a polymer with a polypeptide backbone, of the polyaspartic type. The apatite structure is obtained when the ratio $R_1$ is preferably between 0.0001 and 0.06.

The platelets present in the dispersion according to the invention advantageously exhibit a monetite structure when the polymer used is preferably a polymer chosen from polymers of the homopolymers or copolymers of acrylic acid or methacrylic acid type or a polymer with a polysaccharide backbone.

The dispersions according to the invention can comprise at least one dispersing agent.

Preferably, the dispersing agent is chosen from polyphosphates, in particular sodium tripolyphosphate, but other dispersing agents can be envisaged.

It is also possible to determine, for each dispersion, the molar ratio $R_2$:

$$R_2 = \frac{\text{moles of dispersing agent}}{\text{moles of calcium}}$$

Preferably, this molar ratio, $R_2$, is between 0.001 and 0.5 and preferably between 0.001 and 0.1.

The platelets present in the dispersion according to the invention can comprise doping elements.

Preferably, these doping elements are chosen from alkaline earth metal elements, such as strontium or magnesium, rare earth metal elements, such as ytrrium, or elements with an atomic number of between 57 and 71. Other doping elements can also be envisaged, according to the various applications of the dispersions according to the invention.

The dispersions according to the invention can also comprise various absorbed or bonded chemical entities. These chemical entities can, for example, be ions, such as $Na^+$, $NH_4^+$, $Cl^-$ or $NO_3^-$ ions. These various chemical entities can be present alone or in combination.

The colloidal dispersion can also comprise residual amounts of polymer which complexes calcium, of dispersing or stabilizing agents and of the abovementioned entities present in the continuous phase of the colloidal dispersion.

The concentration of platelets in the colloidal dispersions is preferably greater than 20 g/l, advantageously greater than 100 g/l.

Another subject-matter of the present invention is the calcium phosphate platelets obtained by drying the colloidal dispersion according to the invention.

The term "drying" is understood to mean any technique for the separation of a solid in a liquid. Mention may be made, for example, as drying technique, of ultracentrifugation.

Preferably, the dispersion according to the invention is dried, for example, by atomization, to collect the platelets of the invention in a solid form.

These platelets can exist in the form of a solid powder. In this case, the platelets are preferably agglomerated and can be redispersed under the effect of shearing in a polymer matrix.

These platelets can comprise the various polymers which complex calcium, the various dispersing agents, the various doping elements, and/or the various absorbed or bonded chemical entities described above.

Another subject-matter of the present invention is the process for the preparation of the dispersions according to the invention.

The process for the preparation of the dispersions according to the invention is characterized in that it comprises the following stages:
i) preparing a solution of calcium salts, the pH of which is between 4 and 6;
ii) adding a phosphate solution to the solution obtained in stage i) over a period of time of between 30 minutes and 4 hours, so as to obtain a calcium to phosphorus molar ratio of between 1 and 2.5 and while keeping the pH constant at a value of between 4 and 6;
iii) heat treating, the dispersion obtained in stage ii) at a temperature of between 50° C. and 95° C.;
iv) washing the dispersion obtained in stage iii);
v) adding a dispersing agent to the dispersion obtained in stage iv);
vi) separating the colloidal dispersion obtained in stage v);
and in that it uses, in at least one of stages i) or ii), solutions comprising an ammonium ion;
and in that at least one polymer which complexes calcium is added during stage i) or ii) but before stage iii).

According to a specific embodiment, stages i) and ii) can be reversed. In this case, the first stage of the process is stage ii) and the second stage is stage i).

Stage ii) of the process is preferably carried out by continuous and noninstantaneous addition of the solution obtained in stage i). This addition can also be carried out dropwise or by noncontinuous addition at regular time intervals.

This addition of phosphate solution to the calcium solution is carried out with continuous addition of $OH^-$ ions, preferably of NH$_4$OH, so as to regulate the pH of the solution at the set pH. The set pH is preferably between 4 and 6.

The concentration of OH$^-$ ions in the solution of OH$^-$ ions used to regulate the pH on conclusion of stage ii) can preferably vary between 1M and 6M, more particularly between 2M and 4M.

The addition of OH$^-$ ions in stage ii) can be carried out so as to keep the pH of the regulated dispersion constant at a pH of between 4 and 6 (set pH), preferably at a pH equal to 5, or at a constant flow rate using a pump. The term "constant pH" is understood to mean a pH with a value which has been set at a value of between 4 and 6 and which does not vary by more than 0.2 pH units with respect to this value.

The amount of OH$^-$ ions run in is such that the OH$^-$/P molar ratio is between 1 and 2.5, preferably between 1.5 and 2.

The calcium solution used according to the process of the invention is advantageously a CaCl$_2$ or Ca(NO$_3$)$_2$ solution. This solution can optionally comprise doping elements, such as those indicated above.

Preferably, the concentration of calcium in the solution is between 0.25M and 2.5M, preferably between 1.25M and 1.75M.

The phosphate salt solution used according to the process of the invention is advantageously a solution of ammonium phosphate or of sodium phosphate, in particular of (NH$_4$)$_2$(HPO$_4$) or (NH$_4$)(H$_2$PO$_4$).

According to the process of the invention, the calcium to phosphorus molar ratio is advantageously between 1.3 and 1.7; more particularly, it is 1.66.

Stages i) and ii) are preferably carried out at a temperature of 20° C. plus or minus 5° C. However, other reaction temperatures can be envisaged.

The polymer which complexes calcium described above can be added during stage i) or ii) but before the heat treatment stage (stage iii)).

In the case where the polymer is incorporated in the solution of phosphate ions (stage ii)), the amount of polymer incorporated is determined by the ratio R$_3$, number of moles of constitutive monomer M of the polymer M/number of moles of calcium added, with R$_3$ such as 0.01<R$_3$<0.1. Likewise, the solution of phosphate ions comprising the polymer is adjusted to a pH of between 4 and 6, as indicated above.

On conclusion of stage ii), a dispersion in the form of a precipitate is preferably obtained. By X-ray diffraction on the precipitate formed on conclusion of this stage, which has been centrifuged and then dried at 20° C. A platelet morphology is observed by microscopy for an object with a size on the scale of a micron.

The process according to the invention comprises a heat treatment stage, stage iii), the temperature of which is advantageously between 50° C. and 95° C., preferably between 60° C. and 90° C. This heat treatment is also known as maturing and takes place for approximately 3 h to 24 h, preferably for 3 h to 16 h. The rise in temperature can take place from 1 minute to 30 minutes.

The process according to the invention comprises a washing stage, stage iv). This stage iv) consists of a purification from or removal of the ionic entities of the reaction medium. This removal of the ionic entities can be obtained by membrane ultrafiltration or by any solid/liquid separation process, such as filtration or centrifuging.

In stage iv) of the process according to the invention, the solid precipitate obtained can be washed using an aqueous solution, preferably demineralized water. This washing is preferably carried out using from 1 to 10 times the volume of the supernatant of the precipitate to be washed. The washed precipitate can then be separated.

Stage v) of the process according to the invention is preferably carried out by redispersing the washed precipitate obtained using a solution of the dispersing agent, in particular using a solution of tripolyphosphate.

The concentration of the solution of dispersing agent is determined by the molar ratio R$_4$ of moles of dispersing agent to moles of calcium, R$_4$ being between 0.001 and 0.5, preferably between 0.02 and 0.4, and is also determined by the final concentration of calcium in the dispersion. This final concentration of calcium is preferably 0.025M and 1.5M.

After addition of the solution of dispersing agent, the solution is stirred for advantageously 10 minutes to 6 hours, preferably at ambient temperature. During the stirring, an exchange may occur between the polymer adsorbed at the surface of the platelets and the polyphosphate ions. A further stage of purification, for example by ultrafiltration, can thus optionally be carried out.

The dispersion obtained on conclusion of stage v) is left to stand at ambient temperature. The formation of a precipitate (pellet) and another supernatant colloidal phase is observed.

During stage vi), the colloidal dispersion obtained (supernatant) and the pellet are separated. The pellet is removed by various techniques known to a person skilled in the art, in particular by siphoning or by centrifuging, and the supernatant is retained. This supernatant constitutes the colloidal dispersion according to the invention. This colloidal dispersion can optionally be concentrated by ultrafiltration.

Finally, the invention relates to the use of the dispersions according to the invention or of the platelets according to the invention as food additive, reinforcing filler, thermal insulation filler, pharmaceutical excipient, polishing agent, building materials, additive for oral formulations, in particular dentifrices, or encapsulating agent.

The following examples illustrate the invention without, however, limiting the scope thereof.

EXAMPLES

Example 1

Process for the Preparation of Colloidal Dispersions of Calcium Phosphate Platelets with a Monetite Structure, in the Presence of Polyacrylic Polymer (03 MPP 019)

Stage i): A solution A is prepared by dissolution of 36.75 g of CaCl$_2$.2H$_2$O (MW=147 g/mol) in 150 ml of water. The pH is adjusted to a value of 5 by addition of 0.3 ml of a 0.01M HNO$_3$ solution and the volume is made up to 250 ml with demineralized water.

Stage ii): A solution B is prepared by dissolution in 19.8 g of (NH$_4$)$_2$HPO$_4$ (MW=132 g/mol) in 200 ml of water. This solution is neutralized to a pH of 5 with the addition of 19 ml of a 12M HNO$_3$ solution. The volume is then made up to 250 ml by addition of demineralized water.

The calcium salt solution A is poured into the vessel bottom of a stirred reactor at 20° C. The phosphate solution B is added over 2 hours and at a regulated pH. The pH regulation is obtained using a 3M NH$_4$OH solution. The amount of 3M aqueous ammonia solution run in during the pH maintenance is 92 ml.

At the end of the addition, the mixture is left stirring for 5 minutes. The molar ratio is Ca/P=1.66.

10 ml of aqueous solution comprising 0.47 g of polyacrylic (PAA) polymer (MW=2000, Aldrich) and adjusted to pH 5 with $HNO_3$ are added at a constant flow rate over 5 min using a pump.

The molar ratio $R_3$=0.025.

At the end of the addition, the mixture is left stirring for 5 minutes.

Stage iii): The dispersion is subsequently brought to 80° C. The rise in temperature lasts approximately 30 minutes. The maturing time at 80° C. is 16 hours.

Stage iv): After cooling the dispersion, the solid product is collected by centrifuging. The solid product is washed with 4 times its volume of water and the volume is made up to 600 ml with demineralized water.

A 120 ml aliquot of rehomogenized suspension is dried at room temperature.

The specific surface of the dried product is 71 $m^2/g$. The presence mainly of a monetite structure is observed by X-ray diffraction on the dried product.

Stage v): 7.36 g of sodium tripolyphosphate ($M_w$, $Na_5P_3O_{10}$=368 g) are added to 480 ml of undried washed suspension, i.e. a molar ratio $R_4$ (tripolyphosphate/Ca)=0.1. The mixture is stirred at ambient temperature for 6 hours and is left standing. The formation of a supernatant phase clear to the eye and of a separated material is observed.

Stage vi): The supernatant phase, which constitutes the colloidal dispersion of the invention, is collected.

The mean hydrodynamic diameter is determined, by quasielastic light scattering, as 205 nm. The presence of platelets with a non-monodisperse distribution is observed by transmission electron microscopy. Separate platelets with a size of approximately 60 nm and platelet aggregates are visible.

Example 2

Process for the Preparation of Colloidal Dispersions of Calcium Phosphate Platelets with Apatite Structure in the Presence of Polyaspartic Polymer (03 MPP 006)

Stage i): A solution A is prepared by dissolution of 36.75 g of $CaCl_2.2H_2O$ (MW=147 g/mol) in 150 ml of water. The pH is adjusted to a value of 5 by addition of 0.3 ml of a 0.01M $HNO_3$ solution and the volume is made up to 250 ml with demineralized water.

Stage ii): A solution B is prepared by dissolution in 19.8 g of $(NH_4)_2HPO_4$ (MW=132 g/mol) in 200 ml of water. This solution is neutralized to a pH of 5 with the addition of 19 ml of a 12M $HNO_3$ solution. The volume is then made up to 250 ml by addition of demineralized water.

The calcium salt solution A is poured into the vessel bottom of a stirred reactor at 20° C. The phosphate solution B is added over 2 hours and at a regulated pH. The pH regulation is obtained using a 3M $NH_4OH$ solution. The amount of 3M aqueous ammonia solution run in during the pH maintenance is 92 ml.

At the end of the addition, the mixture is left stirring for 5 minutes. The molar ratio is Ca/P=1.66.

10 ml of aqueous solution comprising 5.1 g of 40% by weight Na polyaspartate (MW=3000, Aldrich) and adjusted to pH 5 with $HNO_3$ are added at a constant flow rate over 5 min using a pump.

The molar ratio $R_3$=0.06.

At the end of the addition, the mixture is left stirring for 5 minutes.

Stage iii): The dispersion is subsequently brought to 80° C. The rise in temperature lasts approximately 30 minutes. The maturing time at 80° C. is 16 hours.

Stage iv): After cooling the dispersion, the solid product is collected by centrifuging. The solid product is washed with 4 times its volume of water and the volume is made up to 600 cc with demineralized water.

An aliquot of suspension is dried at ambient temperature. The specific surface of the dried product is 94 $m^2/g$. X-ray diffraction on the dried product reveals mainly the presence of an apatite structure, with lines shifted slightly towards the small angles with respect to the lines of the hydroxyapatite structure.

Stage v): 3.04 g of sodium tripolyphosphate ($M_w$, $Na_5P_3O_{10}$=368 g) are added to 200 ml of undried washed suspension, i.e. a molar ratio $R_4$ (tripolyphosphate/Ca)=0.1. The mixture is stirred at ambient temperature for 6 hours and is left standing. The formation of a supernatant colloidal phase clear to the eye and of a precipitate is observed.

Stage vi): The supernatant phase, which constitutes the colloidal dispersion of the invention, is collected.

The mean hydrodynamic diameter is determined, by quasielastic light scattering, as 230 nm. The presence of platelets with a non-monodisperse distribution is observed by transmission electron microscopy. Separate platelets with a size of approximately 100 nm and platelet aggregates are visible.

A solids content of approximately 16 g/l is determined by evaporation and calcination of an aliquot at 600° C.

The invention claimed is:

1. A composition comprising a colloidal dispersion of calcium phosphate platelets, wherein the length of the platelets, L, is between 5 and 500 nm and the thickness of the platelets is between 0.5 and 20 nm, and at least one polymer which complexes calcium.

2. The colloidal dispersion according to claim 1, wherein the length of the platelets have an equivalent diameter $d_{50}$ between 50 and 300 nm.

3. The colloidal dispersion according to claim 2, wherein the thickness of the platelets is between 0.5 and 15 nm.

4. The colloidal dispersion according to claim 1, wherein the calcium phosphate platelets exhibit one of a monetite or apatite structure.

5. The colloidal dispersion according to claim 1, wherein the at least one polymer which complexes calcium comprises at least one of a carboxylate, phosphate or phosphonate anionic functional group.

6. The colloidal dispersion according to claim 1, wherein the at least one polymer which complexes calcium is selected from the group consisting of polymers with a peptide backbone of polyaspartic acid, polyglutamic acid, polylysine or polyglycine, homopolymers and copolymers of acrylic acid, methacrylic acid, polyacrylic acid or polymethacrylic acid, copolymers of the polyacrylic-polymethacrylic, polyacrylic-polyhydroxyethylacrylic or polyacrylic-polyacrylamide, polysaccharide polymers, guar gum, carboxymethylcellulose or xanthan gum, modified polysaccharide polymers having phosphate or phosphonate functional groups, and peptide polymers comprising phosphate functional groups.

7. A composition comprising a colloidal dispersion of calcium phosphate platelets wherein the length of the platelets, L, is between 5 and 500 nm and the thickness of the platelets is between 0.5 and 20 nm, and at least one polymer which complexes calcium, wherein the at least one polymer which complexes calcium comprises at least one of a carboxylate, phosphate or phosphonate anionic functional group, and wherein the molar ratio of anionic functional groups present in the polymer to moles of calcium in the dispersion is between 0.0001 and 0.1.

8. The colloidal dispersion according to claim 1, wherein the at least one polymer which complexes calcium has a molecular weight of between 1000 and 20,000 g/mol.

9. The colloidal dispersion according to claim 1, wherein the colloidal dispersion further comprises at least one dispersing agent.

10. The colloidal dispersion according to claim 9, wherein the at least one dispersing agent is a polyphosphate.

11. The colloidal dispersion according to claim 9, wherein the molar ratio of dispersing agent to calcium is between 0.001 and 0.5.

12. The colloidal dispersion according to claim 1, wherein the dispersion further comprises doping elements selected from the group consisting of alkaline earth metal elements, rare earth metal elements, and elements with an atomic number of between 57 and 71.

13. Calcium phosphate platelets obtained by drying the colloidal dispersion of claim 1.

* * * * *